United States Patent [19]

Groff et al.

[11] 4,034,618
[45] July 12, 1977

[54] NOISE REDUCING APPARATUS FOR TRACK TYPE VEHICLE DRIVE SPROCKETS AND MEANS FOR ATTACHING SAME

[75] Inventors: Eugene R. Groff, Chillicothe; Lloyd K. Heinold, Peoria; Harold L. Reinsma, Dunlap, all of Ill.

[73] Assignee: Caterpillar Tractor Co., Peoria, Ill.

[21] Appl. No.: 669,113

[22] Filed: Mar. 22, 1976

[51] Int. Cl.² .................................. B62D 55/12
[52] U.S. Cl. ..................... 74/243 R; 74/243 DR; 305/57
[58] Field of Search ........... 305/57, 56, 21; 74/443, 74/230.1, 243 R, 243 PC, 230.7

[56] References Cited
U.S. PATENT DOCUMENTS

| | | | |
|---|---|---|---|
| 2,003,528 | 6/1935 | Best | 305/57 |
| 3,958,837 | 5/1976 | Chagawa | 74/443 X |

OTHER PUBLICATIONS

Dico Company Catalog, Industrial Wheels, p. 21, June 1971.

*Primary Examiner*—Robert B. Reeves
*Assistant Examiner*—John P. Shannon
*Attorney, Agent, or Firm*—John W. Grant; Oscar G. Pence

[57] ABSTRACT

Apparatus is provided for reducing the noise generated by the meshing of an endless track and a drive sprocket of a track type vehicle including a pair of annular treads of resilient material. The treads are mounted about the peripheries of a respective one of a pair of cylindrical wall members provided on opposite sides of the sprocket for positioning the treads in radially aligned relationship with a respective one of the inwardly facing rail surfaces provided on a respective one of the double chains of the track. The treads are sized so that, in a free state, their outer peripheries are positioned radially outwardly of the normal position of their respective rail surfaces when the track is fully seated with the sprocket so that the rail surfaces engage and compress the treads before the track comes into full mesh with the sprocket, thereby alleviating any impact therebetween.

9 Claims, 12 Drawing Figures

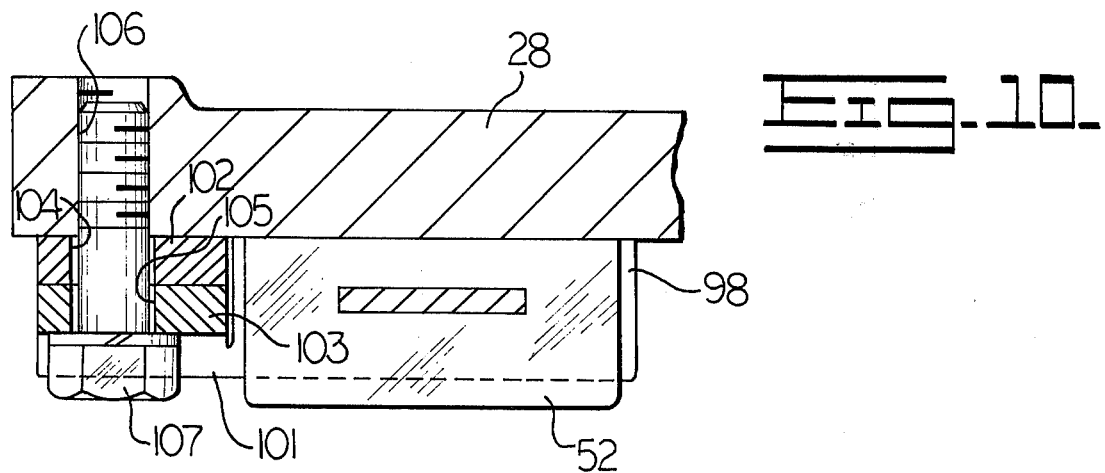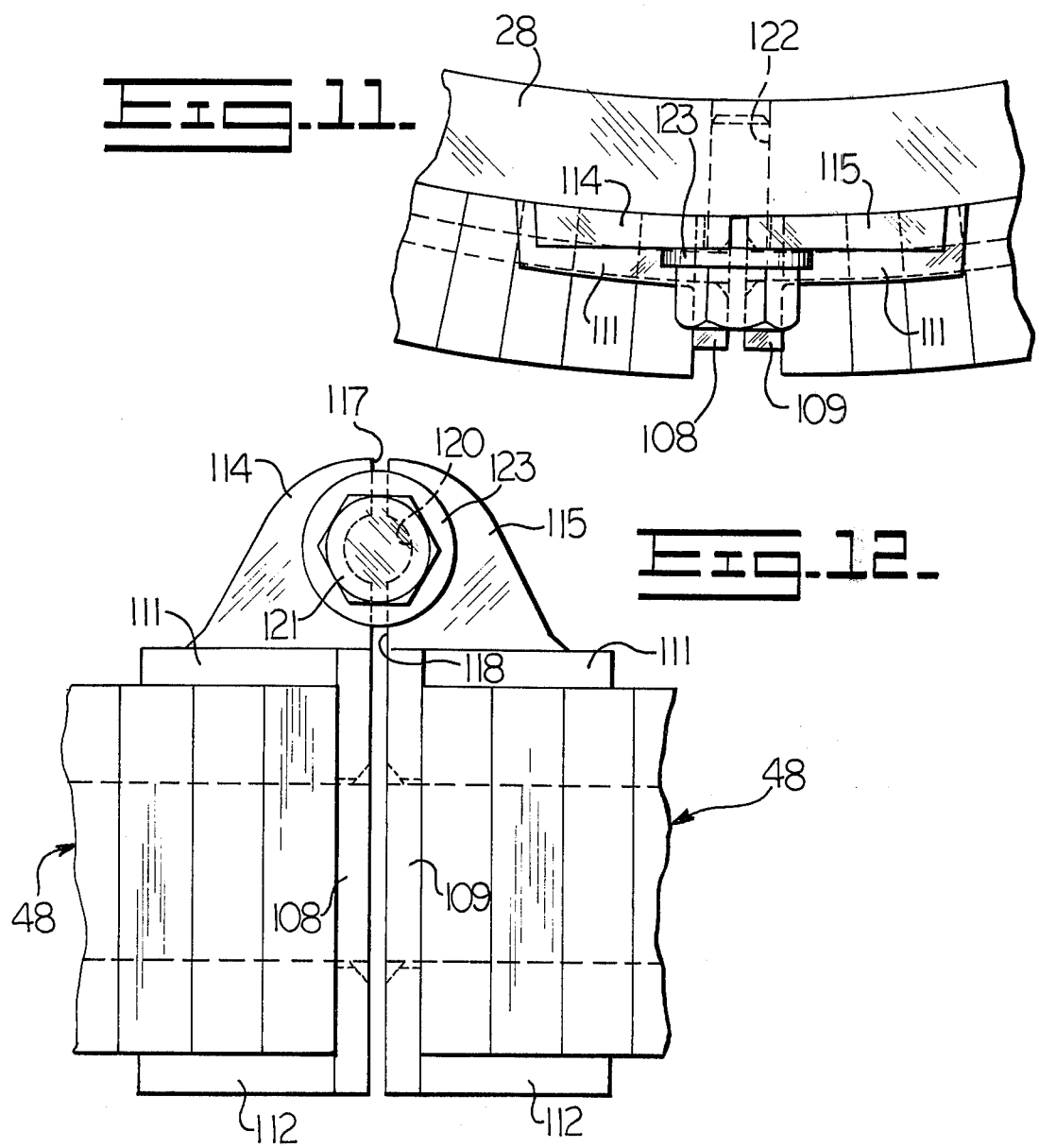

NOISE REDUCING APPARATUS FOR TRACK TYPE VEHICLE DRIVE SPROCKETS AND MEANS FOR ATTACHING SAME

BACKGROUND OF THE INVENTION

This invention relates generally to a drive sprocket for a track-type vehicle, and more particularly to apparatus for quieting the noise generated by the meshing of the sprocket with an endless track driven by such sprocket.

Large track-type vehicles, such as crawler tractors and the like, are generally quite noisy in operation. Such noise is becoming increasingly objectionable, especially when such vehicles are operated in highly populated areas. Consequently, vast amounts of research have been undertaken to pinpoint and alleviate the major sources of noise from such vehicles. It has been found that one of such noise sources is the metal-to-metal impact occurring between the sprocket teeth of the drive sprocket and the track drive bushings of the endless track during their meshing in operation. Various types of devices have been utilized in the past to alleviate this noise, but none have been entirely satisfactory due to their high initial cost or relatively short service life.

SUMMARY AND OBJECTS OF THE INVENTION

Accordingly, it is an object of the present invention to provide apparatus for reducing the noise generated by the meshing of an endless track chain with the drive sprocket of a track-type vehicle by absorbing the impact energy between the track and the sprocket prior to their engagement.

Another object of this invention is to provide the apparatus, as above, which is relatively inexpensive to manufacture and has a relatively long service life.

Another object of this invention is to provide the apparatus, as above, which is constructed so as to be easily assembled and disassembled without disturbing the sprocket or the track chain to minimize the service and replacement costs of such apparatus.

Other objects and advantages of the present invention will become more readily apparent upon reference to the accompanying drawings and the following description.

BRIEF DESCRIPTION OF THE DRAWINGS

FIG. 10 is a sectional view taken along the line X—X of FIG. 9.

FIGS. 11 and 12 are views similar to FIGS. 5 and 6, respectively, but illustrating yet another embodiment of the present invention.

DESCRIPTION OF THE PREFERRED EMBODIMENT

Figure 1:
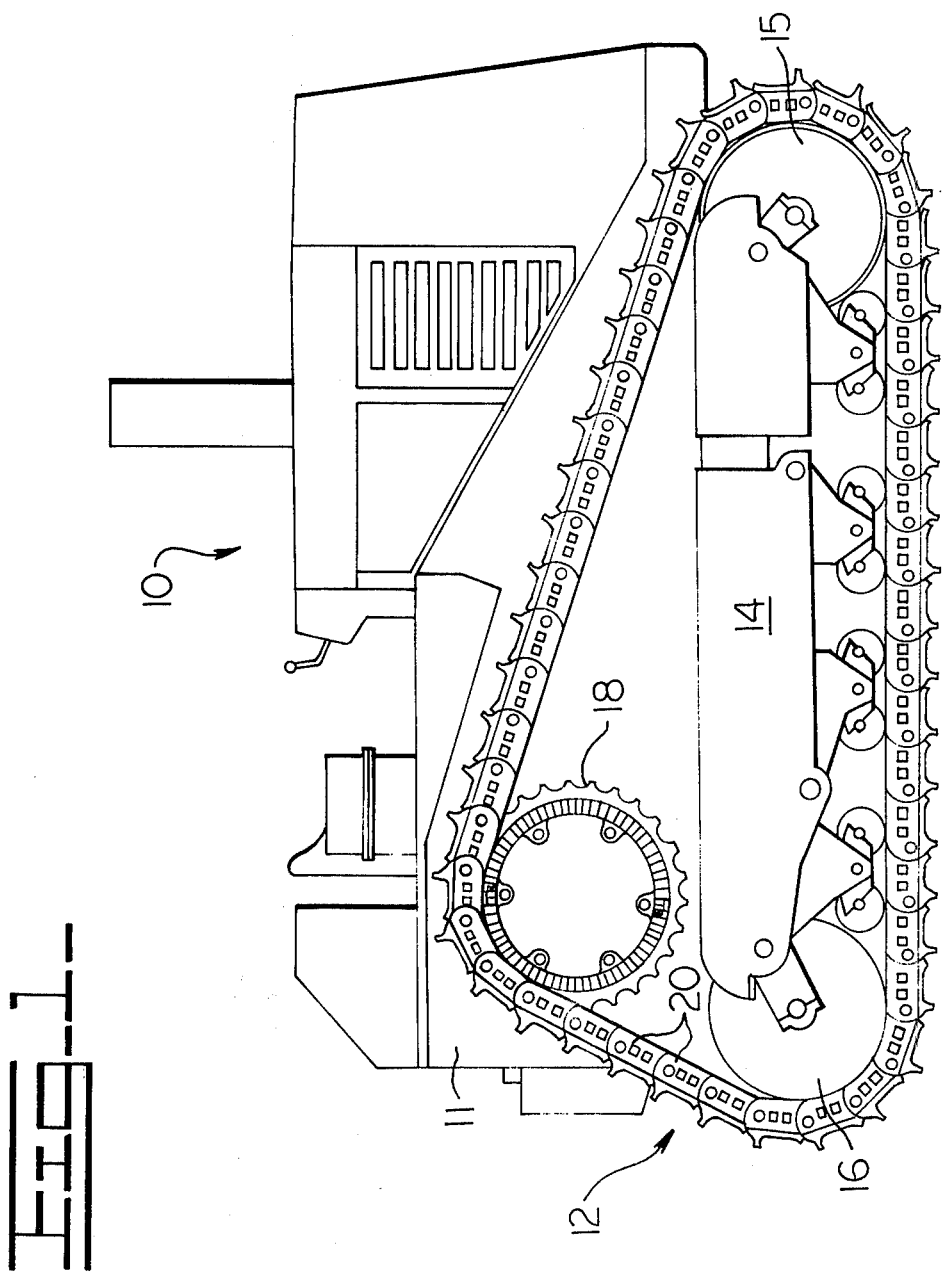
FIG. 1 is an overall side elevational view of a track-type vehicle in which the noise reducing apparatus embodying the principles of the present invention are employed.

In FIG. 1, a track type vehicle, such as a crawler tractor of the type disclosed in U.S. Pat. No. 3,828,873 issued Aug. 13, 1974 to Eldon D. Oestmann, is generally indicated at 10. The tractor includes a main frame 11 which is supported for movement along the ground by a pair of triangularly shaped endless tracks 12, one shown in FIG. 1, which are mounted on the opposite sides of the tractor. Each of the tracks 12 is mounted about a longitudinally disposed track roller frame 14 by a pair of idlers 15 and 16 carried at the opposite ends of the frame, and about a drive sprocket 18 which is disposed elevationally above the track roller frame 14, thus giving the track its triangular configuration. The track roller frame 14, it will be understood, is suitably mounted to the main frame of the tractor in any well known manner.

Figure 2:
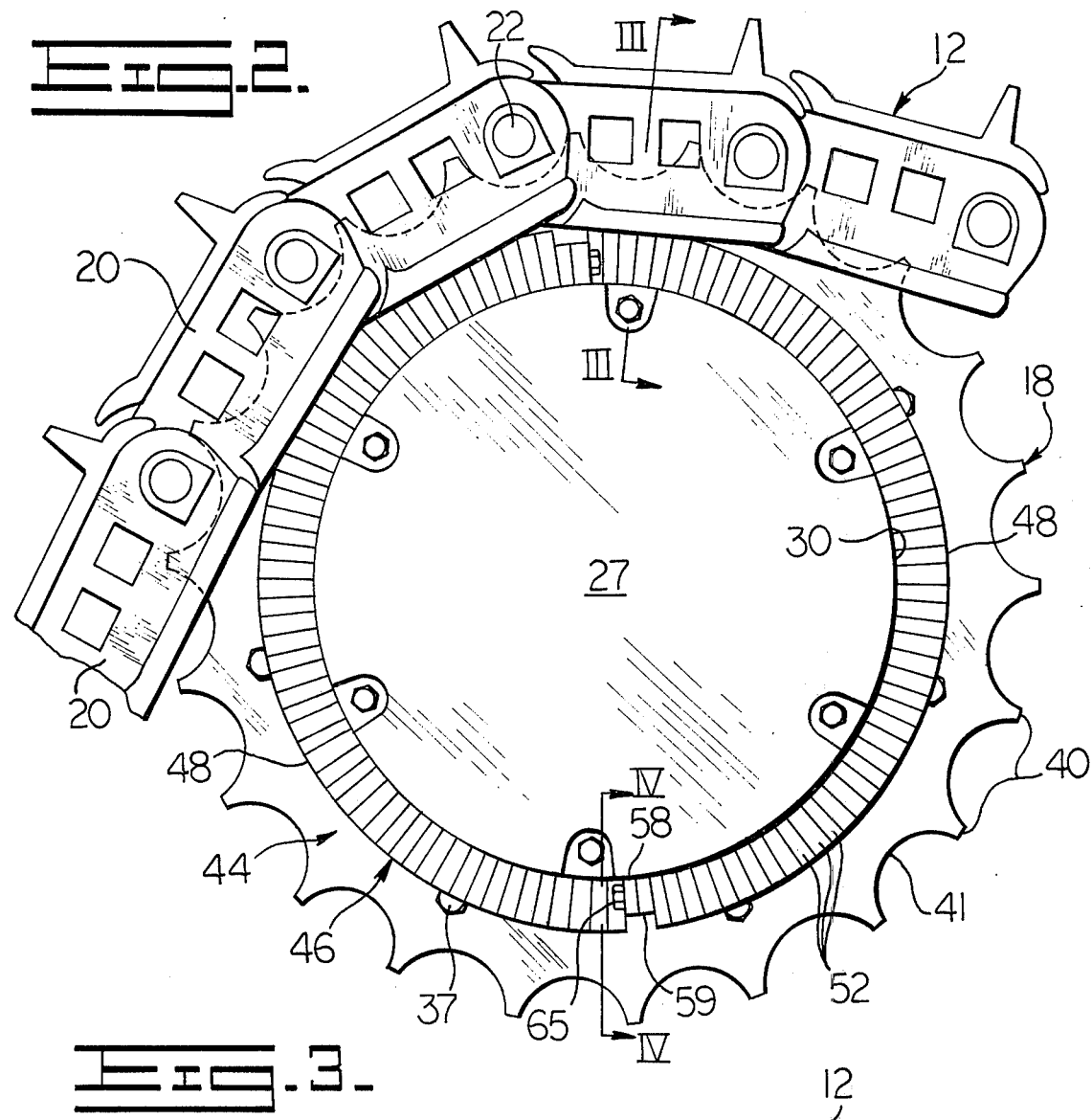
FIG. 2 is an enlarged fragmentary side elevational view of the drive sprocket and a portion of the endless track chain illustrated in FIG. 1.
Figure 3:
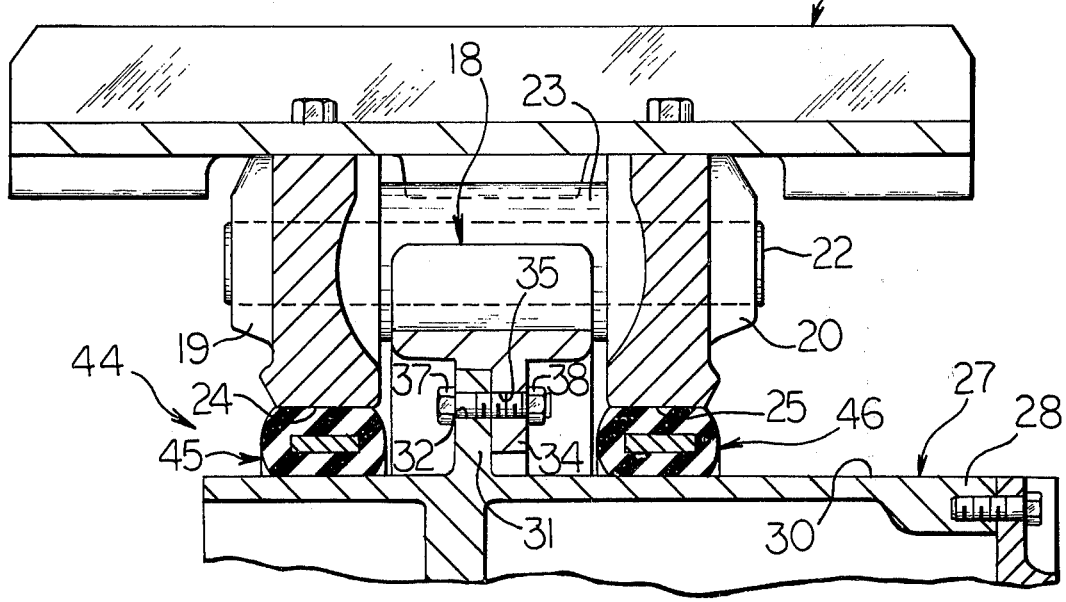
FIG. 3 is an enlarged transverse sectional view taken along the line III—III of FIG. 2.

As best shown in FIGS. 2 and 3, the endless track 12 is constructed from a double chain of mating links 19 and 20. The links are articulately coupled by pins 22 and bushing 23 in a conventional manner to provide a pair of laterally spaced, inwardly facing rail surfaces 24 and 25.

The drive sprocket 18 is rotatably driven by a planetary final drive assembly 27 which, in turn, is suitably connected to be driven by the engine, not shown, of the tractor. As best shown in FIG. 3, the final drive assembly includes a rotatably driven cylindrical wall means or housing 28 defining an outer periphery 30. The housing 28 also includes a radially extending mounting flange 31 disposed intermediate the ends of the housing 28. The flange is provided with a plurality of circumferentially spaced apertures 32, one of which is shown in FIG. 3. The sprocket 18 includes a similar mounting flange 34 having a like plurality of apertures 35 for detachably mounting the sprocket to the final drive housing 28 by suitable means, such as bolts and nuts 37 and 38. The drive sprocket 18 may be constructed from a continuous ring, but is preferably constructed from a plurality of arcuately shaped segments, not shown. About the periphery of the sprocket are provided a plurality of alternating teeth and grooves 40 and 41, respectively. Such teeth and grooves are adapted for seating engagement with respective ones of the bushings 23 of the track 12 as the track is being driven by the sprocket during operation. It will be appreciated that due to the differential velocities between the track bushings and the sprocket, an impact will occur therebetween upon their initial engagement. As such bushings and sprocket are constructed from metal, typically steel, such impact creates an undesirable noise.

In accordance with the present invention, apparatus, generally indicated at 44, is provided for reducing the noise generated by the meshing of the endless track 12 with the drive sprocket 18. Such apparatus includes a pair of annular treads 45 and 46 of resilient material mounted about the periphery 30 of the final drive housing 28 and in radial alignment with a corresponding one of the rail surfaces 24, 25, respectively, of the track 12. As each of the treads is similarly constructed, only one will be hereinafter described in detail with the numerals used to describe the one tread being used to indicate like components of the other.

As best shown in FIG. 2, the tread 46 is constructed from at least one arcuate segment, two of which are indicated by the numeral 48, to provide separable ends so as to facilitate assembly and disassembly as will be hereinafter more fully described. Each segment 48, in turn, is preferably constructed from a plurality of separated pads 52 of fiber reinforced elastomeric material, such as a mixture of rubber and chopped fiber strengthening material. Alternately, a laminated construction of woven fabric material impregnated with rubber may be used. By the term fiber is meant any known strengthening fiber material commonly used in the construction of pneumatic tires and the like, such as steel, nylon, polyester, rayon, fiberglass, etc. The term woven fabric material, in turn, is meant to mean any woven material constructed by any one of the above fiber materials. As a practical matter, the pads are preferably cut from the side walls of worn out or otherwise discarded automobile tires.

Figure 4:
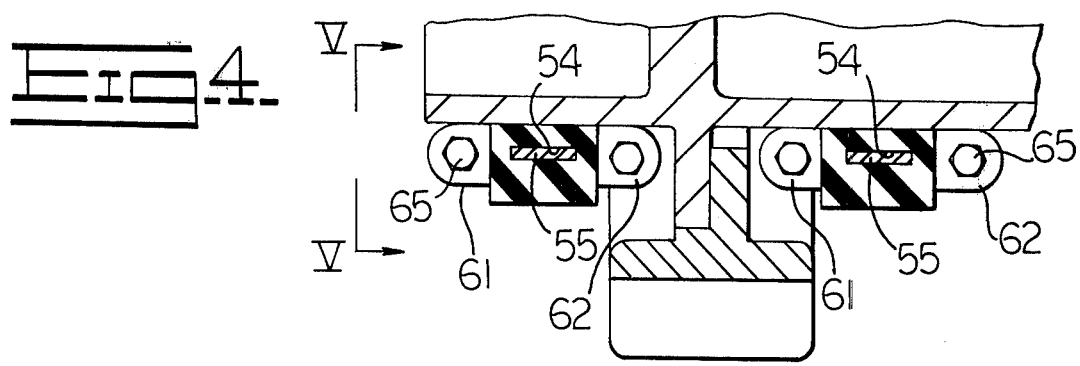
FIG. 4 is a similar transverse sectional view taken along the line IV—IV of FIG. 2.
Figure 5:
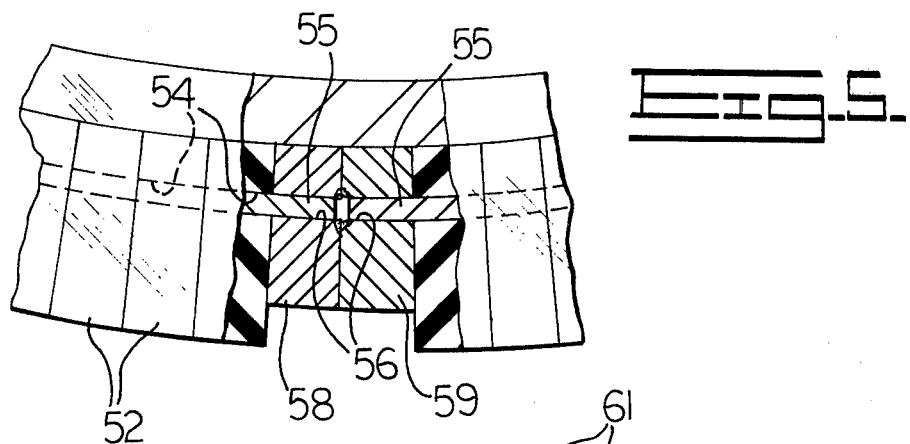
FIG. 5 is a fragmentary side elevational view, with a portion shown in section, taken in the direction of arrows V—V of FIG. 4.

The pads 52 may be tapered in an endways direction so as to facilitate their arrangement in a radially disposed, arcuate configuration about the final drive housing 28. The pads are each provided with an aligned opening 54, FIGS. 4 and 5, which cooperatively form a continuous cavity through their respective segment. A steel band 55 is disposed through the cavity which has opposite end portions protruding from the opposite ends of each segment. As best shown in FIG. 5, such end portions are received through an aperture 56 provided through a respective one of a pair of transversely disposed retaining plates 58 and 59. The plates are fixedly secured, such as by welding, to such protruding end portions of the bands for compressibly holding the pads 52 of each segment therebetween.

Figure 6:
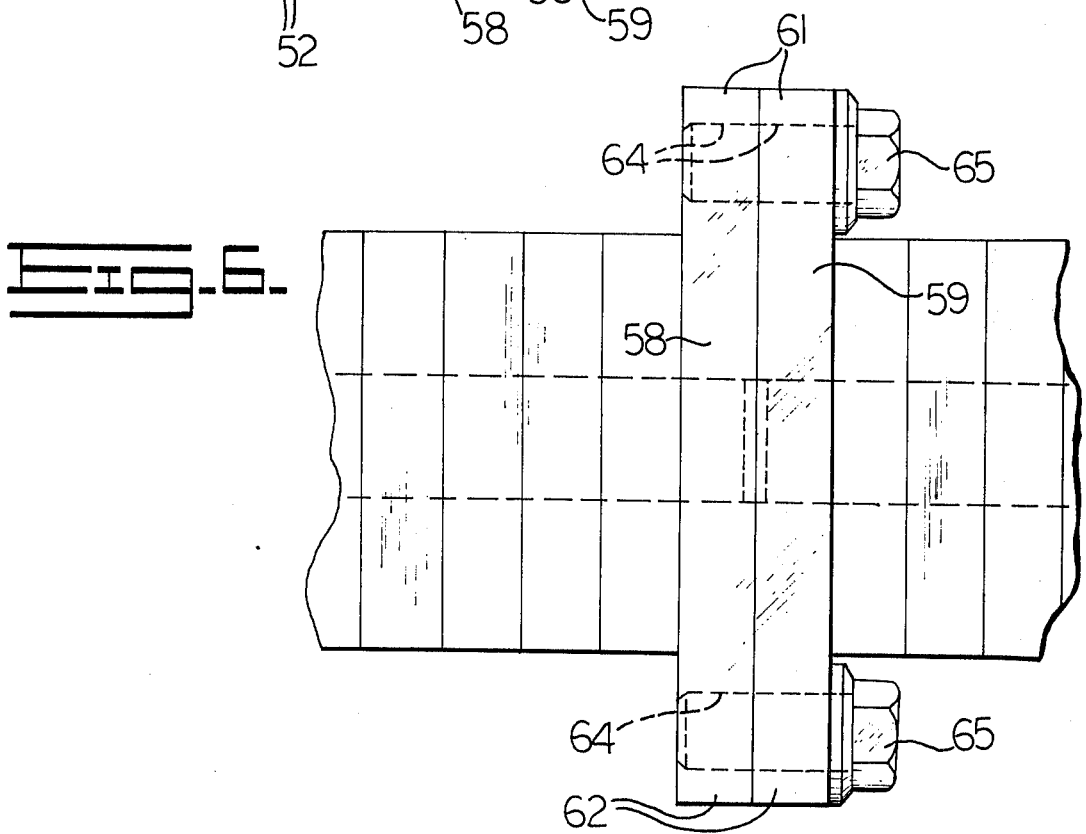
FIG. 6 is a bottom plan view of FIG. 5.

Having described the preferred construction of each tread segment 48, various means for detachably securing such tread segments about the final drive housing 28 without having to disassemble any part of the final drive assembly 27 or the drive sprocket 18, or without breaking the track 12, will now be described. In the preferred embodiment shown in FIGS. 4 through 6, such securing means includes positioning the retaining plates of each tread segment in abutting relation with retaining plates of the adjacent segment and providing such abutting retaining plates with a pair of longitudinally extending ears 61 and 62. The ears of each plate are positionable in transverse abutting relation against the corresponding ears of the abutting plate. Aligned apertures 64 are formed through such ears for receiving fastening means, such as bolts 65 for clamping the adjacent segments together. As shown in FIG. 2, each of the securing means is preferably located in alignment with one of the sprocket teeth 40 to provide maximum clearance with the rail surfaces 24 and 25 of the track 12. It should also be noted that while only two tread segments of approximately 180° each are shown in FIG. 2, various other combinations may be used as well, such as three 120° segments or four 90° segments.

Figure 7:
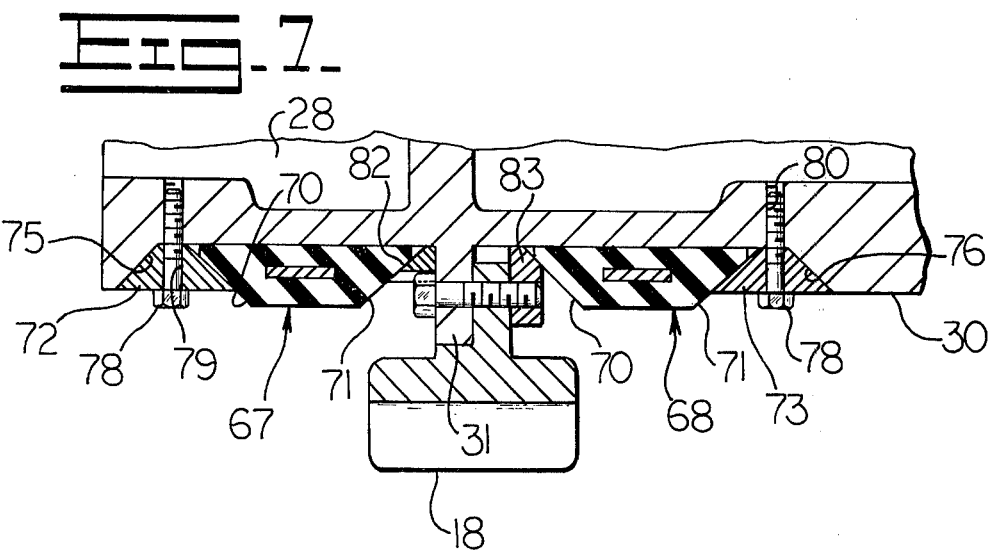
FIG. 7 is a transverse sectional view similar to FIG. 4, but illustrating an alternate embodiment of the present invention.
Figure 8:
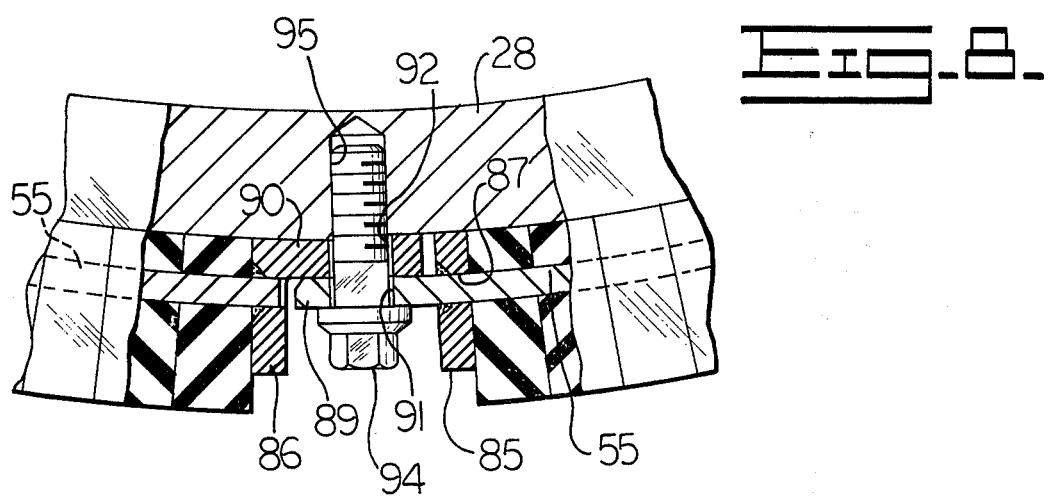
FIG. 8 and 9 are views similar to FIG. 5, but illustrating two other alternate embodiments.

An alternate embodiment of the present invention is shown in FIG. 7, wherein a pair of annular treads 67 and 68 are shown which are constructed from separate segments, as before, but with such segments having opposite tapered sides 70 and 71. The outboard sides, i.e., the sides away from the sprocket 18, of each of the treads is secured by a respective set of arcuate, tapered ring segments 72 and 73. The segments are received into V-shaped grooves formed by the adjacent side of each of the tread segments and a corresponding one of a pair of angled surfaces 75 and 76 provided about the periphery 30 of the final drive housing 28. The segments are secured by suitable bolts 78 which are disposed through apertures 79 formed through the ring segments and are screw threadably secured in mating threaded apertures 80 provided in the final drive housing.

The inboard side of one of the threads 67 is secured by a suitable reversely inclined surface 82 provided about the housing 28 adjacent its mounting flange 31. The inboard side of the other tread 68 is secured by an arcuate screw threaded ring segment 83 serving as the retaining nuts 38 in the preceding embodiment.

Various other embodiments of the securing means are shown in FIGS. 8 through 12 which will now be described. In the embodiment shown in FIG. 8, a pair of retaining plates 85 and 86, corresponding to retaining plates 58 and 59 of the first embodiment, are shown. The retaining plate 85 is provided with an aperture 87 through which the appropriate end of the steel band 55 of it respective segment is received, with the retaining plate 85 being secured to the band by welding or the like so that the end of the band protrudes therefrom to define a first tangentially disposed mounting flange 89. The corresponding retaining plate 86 of the adjacent tread segment is provided with a second tangentially disposed mounting flange 90 positioned in underlying relationship to the first mounting flange and against the periphery of the housing 28. A pair of aligned apertures 91 and 92 are formed through the mounting flanges for receiving a suitable bolt 94 which is screw threadably engaged with a suitable threaded aperture 95 provided in the housing 28.

Figure 9:
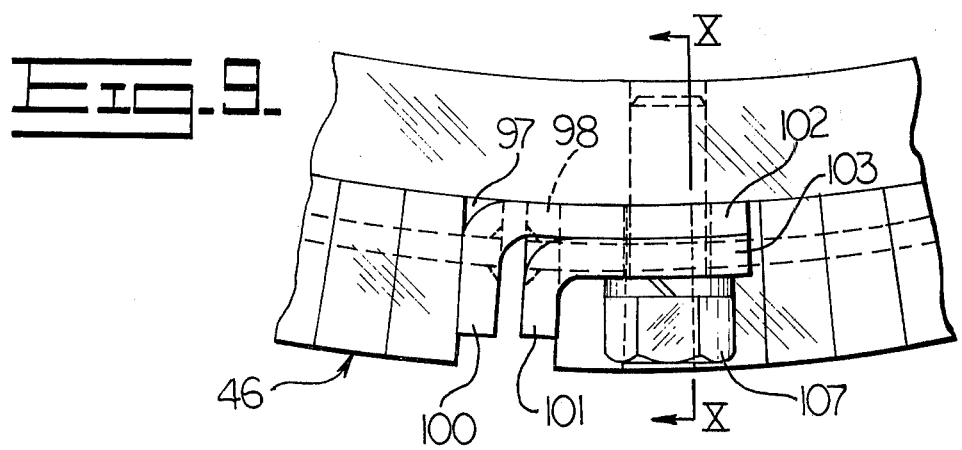

In the embodiment disclosed in FIGS. 9 and 10, a pair of retaining plates 97 and 98 are provided with each of such plates having a longitudinally disposed ear portion 100 and 101, respectively, extending from the outboard side of the tread 46. Each of the ear portions 100, 101 are bent over in the same direction so as to provide a pair of juxtaposed mounting flanges 102 and 103 tangential to the periphery of the final drive housing 28. The flanges have apertures 104 and 105, respectively, which are aligned with a corresponding one of a plurality of threaded apertures 106 provided about the periphery of the housing for receiving bolts 107 for detachably securing the treads thereto.

In the embodiment of FIGS. 11 and 12, a pair of retaining plates 108 and 109 are disclosed, each of which has a pair of side plates 111 and 112, respectively, secured at the opposite ends thereof and extending back along the opposite sides of their respective tread segments 48. A pair of tangentially disposed mounting ears or flanges 114 and 115 are secured to a corresponding one of the side plates 111 on the outboard side of the treads. A pair of abutting edges 117 and 118 are provided on the mounting ears 114 and 115, respectively, in which mating semicircular grooves are formed to cooperatively define an aperture 120 for receiving a mounting bolt 121 which is screw threadably secured in a suitable threaded aperture 122 provided in the housing 28. An enlarged washer 123 is preferably provided about the bolt.

OPERATION OF THE INVENTION

While the operation of the present invention is believed clearly apparent from the foregoing description, further amplification will subsequently be made in the following brief summary of such operation. The annular treads 45 and 46 of the present invention are positioned about the periphery of the final drive housing 28 or supported in any other suitable manner, not shown, on the opposite sides of the sprockets 18 so as to be in alignment with a respective one of the rail surface 24 and 25 of the track 12. The outer peripheries of the treads are diametrically sized relatively to the pitch diameter of the sprocket so that during operation, the rail surfaces of the tracks will engage the treads before the bushings 23 of the track can become fully engaged within the grooves 41 of the sprocket in a normal manner during enwrapment about the sprocket. In fact, a predetermined amount of compression in the height of the treads is desirable before the bushings become fully seated in the sprocket grooves 41. Such predetermined amount of compression is preferably about 20% of the normal height of the treads.

In operation, it will be appreciated that the track will travel through a predetermined wrap angle as it passes over the sprocket. It will also be appreciated in the art that the driving force transmitted from the sprocket to the track is substantially entirely tangential to the sprocket at the beginning of the wrap angle so that the radial component of force thereat is at a minimum. Such radial component increases gradually to a maximum at a position substantially mid-way in the wrap angle and then decreases again to the end of the wrap angle where the track disengages from the sprocket. Preferably, the compression rate of the treads is selected so as to be somewhat less than the maximum radial component of the driving force encountered during normal operation. Thus, it will be apparent that the track bushings 23 are brought into engagement with the grooves 41 of the sprocket gradually so as to alleviate any impact therebetween. Thus, the noise normally generated by the meshing of the sprocket and track is greatly reduced or alleviated.

In addition, the treads are effective in exerting a sufficient radial force on the track to lift bushings out of engagement with their respective sprocket grooves prior to the end of the wrap angle. This alleviates the normal scrubbing action therebetween which is effective in extending the service life of such bushings.

The treads 45 and 46 are advantageously constructed from arcuate segments 48 so as to facilitate their placement about the final drive housing 28 without the necessity of breaking the track chain 12 or disassembling the sprocket 18 or final drive assembly 27. This, in connection with the various easily detachable securing means for fastening the treads about the final drive housing, facilitate the replacement of the treads when necessary at minimal expense.

It will also be appreciated that the construction of the segments from the reinforced pads make the tread extremely durable so as to provide a long service life.

Thus from the foregoing it is obvious that the particular construction of the annular treads 45 and 46 fully satisfies the objects of the present invention and are useful in reducing the noise generated by the meshing of an endless track with a sprocket of a track-type vehicle.

While the invention has been described and shown with particular reference to the preferred embodiments, it will be apparent that variations might be possible that would fall within the scope of the present invention, which is not intended to be limited except as defined in the following claims.

What is claimed is:

1. Apparatus for reducing the noise generated by the meshing of an endless track and a drive sprocket of a track-type vehicle in which the track has a double chain defining a pair of inwardly facing rail surfaces which are disposed at a predetermined radial distance from the central axis of the sprocket when the track is fully seated with the sprocket, the apparatus comprising:
   a pair of cylindrical wall members extending in longitudinal coaxial relation from the opposite sides of the sprocket, said wall members each having an outer periphery spaced radially inwardly from a respective one of said rail surfaces;
   a pair of annular treads of resilient material mounted about the periphery of a respective one of said wall members in radial aligned relation with a corresponding one of said rail surfaces, each tread being sized so that, in a free state, its outer periphery is radially outward of said predetermined radial distance of its respective rail surface so that the rail surfaces engage and compress the treads before the track comes into full mesh with the sprocket, each of said treads being constructed from at least one arcuate segment having separable opposite ends;
   means for detachably securing each of said segments about said outer peripheries of said wall members so that replacement of said treads is possible without disturbing the sprocket or breaking the track chain; and
   wherein each of said segements of the treads is constructed from a plurality of separate, longitudinally disposed pads arranged in side-by-side abutting relation circumferentially about the wall members, each pad having an aligned opening forming a continuous cavity through its respective segment, a metal band disposed through said cavity having opposite ends adjacent the corresponding ends of said segments, and a pair of transverse retaining plates fixedly secured to the opposite ends of said band for compressively holding the pads therebetween.

2. The apparatus of claim 1 wherein said pads are constructed from an elastomeric material reinforced with a plurality of plies of woven strengthening material.

3. The apparatus of claim 2 wherein said treads include at least two segments apiece and wherein said securing means includes means forming a pair of ears on each of said retaining plates extending from the opposite sides of said segments, said ears being positionable in abutting relation against the corresponding ears of the retaining plate of the adjacent segment, apertures formed through said ears, and bolt means disposed through said apertures for clamping said adjacent segments together.

4. The apparatus of claim 2 wherein the track-type vehicle includes a final drive assembly for operatively driving the sprocket, said final first drive assembly having a cylindrical housing defining said wall members and a radially extending flange formed thereabout between said treads, said flange having a plurality of circumferentially spaced apertures formed therethrough; and wherein said sprocket is constructed from a plurality of arcuate sprocket segments having a like plurality of apertures corresponding to said apertures of the flange and including bolt means disposed through corresponding ones of said apertures for detachably securing said sprocket segments about the housing.

5. The apparatus of claim 4 wherein said housing includes a pair of angled surfaces adjacent a corresponding one of the outboard sides of the treads are angled so as to form a V-shaped groove in cooperation with said angled surfaces of the housing; and wherein said securing means includes a plurality of tapered arcuate ring segments positioned within said groove and fastening means for securing said segments in clamped engagement against said angled surfaces of the treads and said housing.

6. The apparatus of claim 5 wherein the inboard side of said treads are also angled and said housing includes an angled surface corresponding to one of said inboard sides for retaining engagement thereagainst and said bolt means for securing said sprocket segments includes a plurality of arcuate tapered screw threaded ring segments corresponding to the other of said angled inboard sides for retaining engagement thereaginst.

7. The apparatus of claim 2 wherein said retaining plates at one end of each segment includes an aperture for receiving a protruding end of said band therethrough, said protruding and defining a first tangentially disposed mounting flange, and the retaining plate at the adjacent end of the adjoining segment includes a second tangentially disposed mounting flange positioned in underlying relationship to said first mounting flange and in engagement against said housing, aligned apertures formed through said first and secon mounting flanges positioned in alignment with one of a plurality of threaded apertures provided in circumferential relationship about the wall members, and a like plurality of bolts disposed through said mounting flanges and in screw threaded engagement with said threaded apertures of the wall members.

8. The apparatus of claim 2 wherein the adjoining retaining plates at the adjacent ends of said segments each have a longitudinally disposed ear portion extending from the outboard side of the treads, said ear portions being bent over in the same direction to form a pair of juxtaposed mounting flanges in tangential relation to the periphery of the wall members and wherein said securing means includes a plurality of bolts, each being disposed through a pair of aligned apertures in the mounting flanges and screwthreadably secured into a like plurality of threaded apertures provided in the wall members.

9. The apparatus of claim 3 wherein the retaining plates of the adjoining ends of said segments are each provided with a pair of side plates secured at their opposite ends and extending back along their respective sides of the segments, and a respective one of a pair of mating ears. each ear being secured to a corresponding one of said side plates on the outboard side of said treads and disposed in tangential relation to the wall members, said ears having a pair of abutting edges with a semicircular groove formed in each of said edges so as to cooperatively define an aperture; and wherein said securing means includes a plurality of bolts disposed through each of said apertures at the ends of said segments and screw threadably secured into a like plurality of screw threaded apertures in the wall members.

* * * * *